US 6,748,910 B2

(12) United States Patent
Müller et al.

(10) Patent No.: US 6,748,910 B2
(45) Date of Patent: Jun. 15, 2004

(54) METHOD OF BOUNDING CAM PHASE ADJUSTMENT IN AN INTERNAL COMBUSTION ENGINE

(75) Inventors: Martin Müller, Ann Arbor, MI (US); Edward George Himes, Novi, MI (US); Jeffrey M. Pfeiffer, Walled Lake, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/283,756

(22) Filed: Oct. 30, 2002

(65) Prior Publication Data

US 2004/0083996 A1 May 6, 2004

(51) Int. Cl.$^7$ .................................................. F01L 1/34
(52) U.S. Cl. ................. 123/90.15; 123/406.23
(58) Field of Search ................. 123/90.15, 90.16, 123/90.17, 406.23

(56) References Cited

U.S. PATENT DOCUMENTS 5,103,780 A * 4/1992 Ishii ........................ 123/90.15
6,308,671 B1 * 10/2001 Reed et al. ............... 123/90.15
6,386,166 B1    5/2002 Scott et al.
6,393,903 B1    5/2002 Reed et al.
6,612,162 B2    9/2003 Han et al.
6,637,390 B1   10/2003 Dauer et al.

* cited by examiner

*Primary Examiner*—Thomas Denion
*Assistant Examiner*—Jaime Corrigan
(74) *Attorney, Agent, or Firm*—Jimmy L. Funke

(57) ABSTRACT

A cam phase control method for an internal combustion engine schedules cam phase to optimize emissions and fuel economy, but bounds the scheduled cam phase for continuous achievement of the desired inlet airflow. The volumetric efficiency required to achieve the desired inlet airflow at a specified intake manifold vacuum is compared to the maximum achievable volumetric efficiency at the specified vacuum. When the required volumetric efficiency is less than the maximum value, the cam phase is controlled according to the lesser of the scheduled cam phase and the highest cam phase for achieving the required volumetric efficiency; when the required volumetric efficiency is equal to or greater than the maximum value, the cam phase is controlled to a setting that maximizes the volumetric efficiency.

5 Claims, 2 Drawing Sheets

METHOD OF BOUNDING CAM PHASE ADJUSTMENT IN AN INTERNAL COMBUSTION ENGINE

TECHNICAL FIELD

This invention relates to cam phase adjustment in an internal combustion engine, and more particularly to a method of bounding the cam phase based on the requested engine power output.

BACKGROUND OF THE INVENTION

Engine cam phase adjustment can be utilized to improve engine exhaust gas emissions and fuel economy. Typically, the cam phase (intake and/or exhaust) is adjusted to increase the overlap of the intake and exhaust valve openings during low-to-medium load operation. This reduces the volumetric efficiency of the engine, but increases internal recirculation of engine exhaust gas. Emissions are improved because the recirculated exhaust gas tends to reduce the peak combustion temperature and pressure, and fuel economy is improved because the recirculated exhaust gas raises the intake manifold pressure, reducing engine pumping losses. Under high load operation, significantly higher inlet airflow is required, and the cam phase is shifted to a setting that maximizes the volumetric efficiency. Unfortunately, this control can noticeably degrade the power response of the engine on transitions from medium load to high load. Accordingly, what is needed is a cam phase control for achieving significant emission and fuel economy improvements without degrading the engine power response.

SUMMARY OF THE INVENTION

The present invention is directed to an improved cam phase control for an internal combustion engine in which the cam phase is scheduled to optimize emissions and fuel economy, but bounded for continuous achievement of the desired inlet airflow. According to the method, the volumetric efficiency required to achieve the desired inlet airflow at a specified intake manifold vacuum is compared to the maximum achievable volumetric efficiency at the specified vacuum. When the required volumetric efficiency is less than the maximum value, the cam phase is controlled according to the lesser of the scheduled cam phase and the highest cam phase for achieving the required volumetric efficiency; when the required volumetric efficiency is equal to or greater than the maximum value, the cam phase is controlled to the setting that maximizes the volumetric efficiency.

DESCRIPTION OF THE PREFERRED EMBODIMENT

Figure 1:
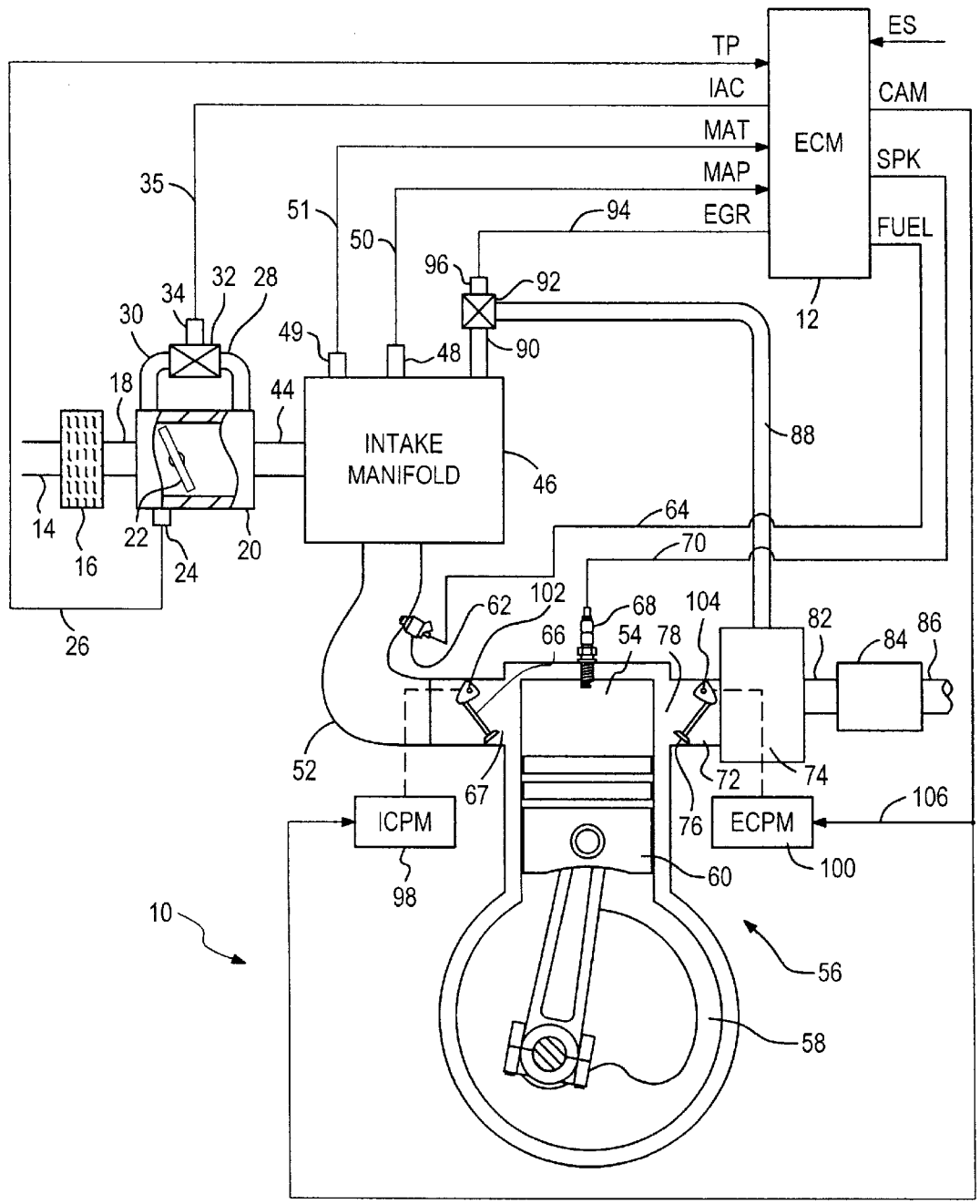
FIG. 1 is a schematic diagram of an internal combustion engine having intake and exhaust cam phase adjustment mechanisms and a microprocessor-based engine control unit programmed for carrying out the control method of this invention.

Referring to the drawings, and particularly to FIG. 1, the reference numeral 10 generally designates a four-stroke internal combustion engine controlled by a microprocessor-based engine control module (ECM) 12. Inlet air at atmospheric pressure passes through fresh air inlet 14, air cleaner 16 and intake duct 18 into throttle body 20. A throttle plate 22 rotatably disposed in the throttle body 20 is manually or electronically positioned to vary restriction to the inlet air. The position of throttle plate 22 is detected by the sensor 24, which provides a throttle position signal (TP) to ECM 12 on line 26. A portion of inlet air is routed past throttle plate 22 through conduits 28 and 30 and a conventional idle air bypass valve 32. The bypass valve 32 is positioned by a stepper motor 34, and the ECM 12 supplies an idle air control (IAC) signal on line 35 to stepper motor 34 during engine idle for purposes of maintaining a desired engine idle speed. Airflow out of throttle body 20 is coupled through intake duct 44 into the intake manifold plenum volume 46 (referred to hereinafter simply as the intake manifold). Conventional pressure and temperature transducers 48 and 49 are exposed to gas pressure in the intake manifold 46 and provide manifold absolute pressure and temperature signals (IMAP, IMAT) to ECM 12 via lines 50 and 51, respectively. Individual cylinder intake runners 52 couple intake manifold 46 to the combustion chambers 54 of respective engine cylinders 56, only one cylinder 56 being shown in FIG. 1. Each combustion chamber 54 is separated from the engine crankcase 58 by a respective piston 60 which engages the inside wall of the respective cylinder. A quantity of fuel is injected via conventional fuel injector 62 in response to a fuel injection command signal (FUEL) from ECM 12 on line 64. In the illustrated embodiment, the fuel mixes with the inlet air and is drawn into the combustion chamber 54 during an intake event when a cam-operated intake valve 66 opens an intake port 67. The air-fuel mixture is ignited in the combustion chamber 54 during a combustion event initiated by a timed spark across the spaced electrodes of spark plug 68, which is controlled by ECM 12 via a spark control signal (SPK) line 70. Gasses produced during the combustion event are exhausted through exhaust runner 72 to exhaust manifold 74 during an exhaust event when a cam-operated exhaust valve 76 opens an exhaust port 78. The exhaust gasses pass through the exhaust manifold 74 to an exhaust duct 82 leading to catalytic converter 84 and tailpipe 86.

A portion of the exhaust gas is drawn from exhaust manifold 74 through conduits 88, 90 and exhaust gas recirculation (EGR) valve 92 into the intake manifold 46 for mixing with inlet air for delivery to the cylinder combustion chambers 54. The ECM 12 issues an EGR control signal (EGR) on line 94 for positioning the EGR valve 92 with solenoid or stepper motor 96 to vary the dilution of the fresh inlet air with exhaust gasses for improved emission control and fuel economy.

The engine 10 is additionally equipped with intake and exhaust variable cam phase mechanisms 98 and 100 coupled to intake and exhaust camshafts 102, 104 for varying the phase or timing of the intake and exhaust valves 66, 76 relative to the base camshaft timing. In the illustrated embodiment, the intake and exhaust cam phase mechanisms 98, 100 operate in unison in response to a single cam phase control signal CP on line 106 to achieve a so-called dual-equal cam phase control. Other controls are also possible, including just intake or exhaust cam phase control, or dual independent cam phase control.

As indicated above, ECM 12 adjusts the cam phase primarily during low-to-medium load operation to increase the overlap of the intake and exhaust valve openings for increased internal recirculation of engine exhaust gas. Although this reduces the volumetric efficiency of the engine, NOx emissions and fuel economy are improved because the recirculated exhaust gas tends to reduce the peak combustion temperature and pressure, while raising the intake manifold pressure to reduce engine pumping losses. However, it is difficult to schedule the cam phase based on emission and fuel economy considerations without significantly degrading the engine power response during transitions to high load. The present invention overcomes this problem by bounding the scheduled cam phase in a manner to ensure that the desired inlet airflow is always achievable. As a result, the calibration engineers can schedule the cam phase based on emission and fuel economy considerations, without regard to the impact of the cam phase scheduling on engine power response. In general, the method of the present invention compares the volumetric efficiency required to achieve the desired inlet airflow at a specified intake manifold vacuum level to the maximum volumetric efficiency at the same vacuum level. When the required volumetric efficiency is less than the maximum value, the cam phase is controlled according to the lesser of the scheduled cam phase and the highest cam phase for achieving the required volumetric efficiency; when the required volumetric efficiency is equal to or greater than the maximum value, the cam phase is controlled to a setting that maximizes the volumetric efficiency.

Figure 2:
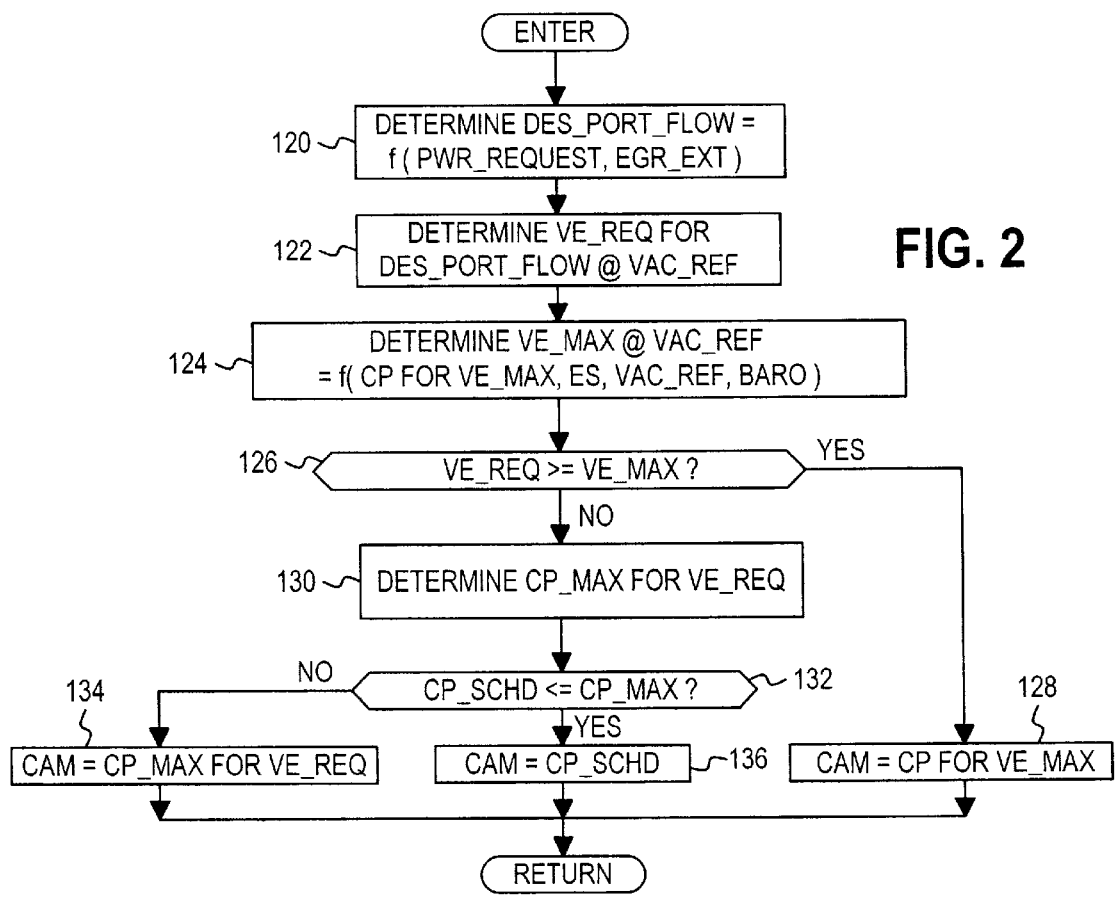
FIG. 2 is a flow diagram representing a software routine executed by the engine control unit of FIG. 1 according to this invention.

FIG. 2 depicts a flow diagram representative of a software routine periodically executed by ECM 12 for carrying out the control of this invention. The blocks 120 and 122 are first executed to determine the desired intake port flow(DES_PORT$_{FLOW}$) of engine 10 and the engine volumetric efficiency (VE_REQ) required to achieve the desired port flow at a specified intake manifold vacuum level (VAC_REF). Typically, VAC_REF is a relatively small value to ensure that external EGR and other vacuum-related functions are supported, but may be zero if desired. As indicated at block 120, DES_PORT_FLOW is based on both the driver power request (PWR_REQUEST) and the desired flow (EGR_EXT) of external EGR. The volumetric efficiency VE_REQ of block 122 may be calculated as a function of DES_PORT_FLOW, engine speed ES and intake manifold temperature MAT and pressure MAP, by re-arranging the standard speed-density formula as follows:

$$VE\_REQ=(2*R*MAT*DES\_PORT\_FLOW)/(MAP*Vd*ES)$$

where Vd is the combustion chamber volume and R is a gas constant.

The blocks 124 and 126 then determine the maximum volumetric efficiency (VE_MAX) achievable at the specified vacuum level VAC_REF, and compare VE_REQ to VE_MAX. As indicated at block 124, the value of VE_MAX may be determined by table look-up as a function of MAP (i.e., BARO-VAC_REF), engine speed ES, and the cam phase (CP FOR VE_MAX) that maximizes volumetric efficiency at the current engine speed ES.

If VE_REQ is greater than or equal to VE_MAX, the block 128 sets the CAM signal output to CP FOR VE_MAX, the cam phase that maximizes volumetric efficiency at the current engine speed ES. However, if VE_REQ is less than VE_MAX, the desired port flow DES_PORT_FLOW can be achieved at an increased cam phase (relative to CP FOR VE_MAX), and the blocks 130 and 132 are executed to determine how much cam phasing is allowed. The block 130 determines maximum cam phase CP_MAX that can occur while still satisfying VE_REQ, and the block 132 compares CP_MAX to the scheduled cam phase (CP_SCHD). If CP_SCHD is less than or equal to CP_MAX, the block 134 sets the CAM signal output to CP_SCHD; if CP_SCHD is greater than CP_MAX, the block 136 sets the CAM signal output to CP_MAX.

The value of CP_MAX may be determined in at least one of two ways. In a preferred embodiment, CP_MAX is determined by modeling the volumetric efficiency as a quadratic function of cam phase, and solving for the roots (cam phase) using VE_REQ as the volumetric efficiency. That is, VE_REQ may be expressed as a function of CP_MAX as follows:

$$VE\_REQ=a_0-(a_1*CP\_MAX)-(a_2*CP\_MAX^2)$$

where the coefficient $a_0$ represents an initial or base volumetric efficiency, and the coefficients $a_1$ and $a_2$ are empirically determined based on engine speed ES and a ratio of the intake and exhaust manifold pressures. In this case, the root closest to the current cam phase is selected as CP_MAX. Alternatively, CP_MAX may be determined by looking up volumetric efficiency values (at the current engine speed ES and the specified vacuum VAC_REF) for various cam phase angles, identifying the volumetric efficiency values that bracket VE_REQ, and then determining the value of CP_MAX by interpolation.

Figure 3:
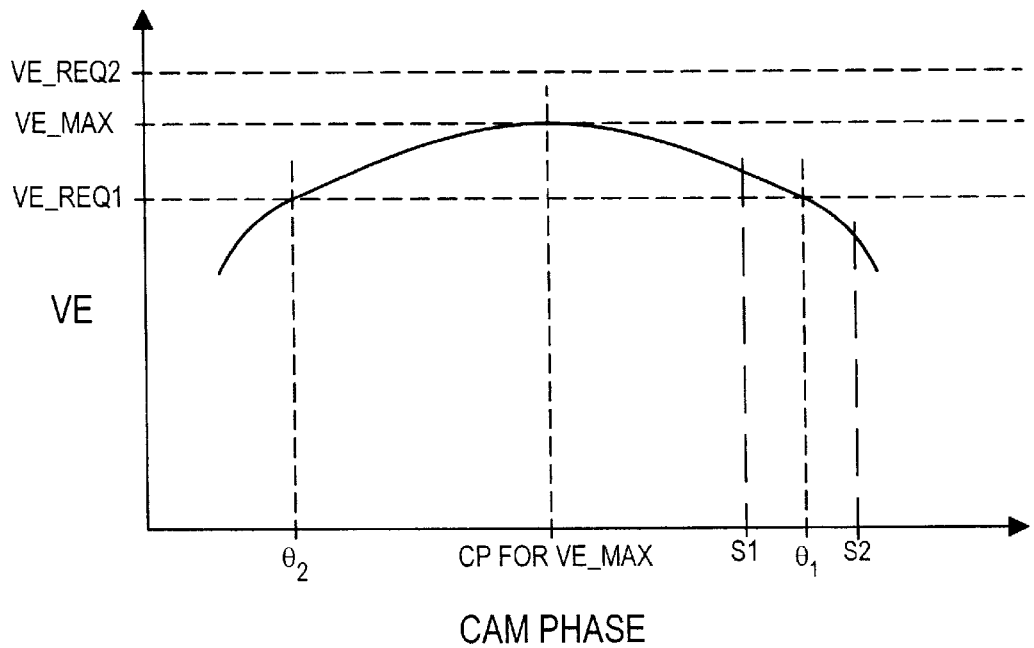
FIG. 3 is a graph depicting a relationship between volumetric efficiency and cam phase angle for the engine of FIG. 1.

The operation of this invention is graphically depicted in FIG. 3, where the solid trace represents the volumetric efficiency of engine 10 as a function of cam phase angle, assuming a dual-equal cam phase control implementation. Referring to FIG. 3, the cam phase "CP FOR VE_MAX" coincides with the peak volumetric efficiency VE_MAX, and the volumetric efficiency is reduced for higher cam phase angles such as the scheduled cam phase values S1 and S2. The remaining cam phase values $\theta_1$ and $\theta_2$ designate the roots of CP_MAX computed at block 130 according to the preferred embodiment of this invention.

If VE_REQ is greater than VE_MAX, as represented by VE_REQ 2, the block 126 is answered in the affirmative, and block 128 reduces CAM to CP FOR VE_MAX since no value of CP_MAX will satisfy VE_REQ. If VE_REQ is less than VE_MAX, as represented by VE_REQ1, the block 126 is answered in the negative, and the block 130 determines that CP_MAX has a value of $\theta_1$. For the sake of illustration, it is assumed that the cam phase is initially at or near a scheduled value, and that the root $\theta_1$ is selected for CP_MAX since it is closest to the current cam phase. If the scheduled cam phase less than $\theta_1$, as designated by cam phase S1, engine 10 is capable of achieving VE_MAX at the scheduled value; no bounding is necessary, and block 136 sets CAM in accordance with the scheduled value S1. If the scheduled cam phase is greater than $\theta_1$, as designated by cam phase S2, VE_MAX cannot be achieved with the scheduled value, and the block 134 bounds the scheduled cam phase by reducing CAM to $\theta_1$.

In summary, the bounding method of the present invention allows easy and aggressive scheduling of cam phase based on fuel economy and exhaust emission considerations by ensuring that the scheduled cam phase will not degrade the engine power response. While described in reference to the illustrated embodiment, it is expected that various modifications will occur to those skilled in the art. For example, although described in reference to a dual-equal cam phase implementation, the method of this invention may also be applied to intake or exhaust cam phase controls, or to a dual-independent cam phase control. In the later case, the method is applied to the scheduled exhaust cam phase first, and then to the scheduled intake cam phase if necessary. Thus, it should be understood that methods incorporating these and other modifications may fall within the scope of this invention, which is defined by the appended claims.

What is claimed is:

1. A method of controlling cam phase angle in an internal combustion engine including a schedule of cam phase values for improving engine exhaust emissions and fuel economy under various operating conditions, the method comprising the steps of:

determining a desired engine airflow for achieving an engine power request;

determining a required volumetric efficiency of said engine for achieving the desired engine airflow with a specified intake manifold vacuum level;

determining a cam phase value for achieving the required volumetric efficiency with said specified intake manifold vacuum level;

determining which of the scheduled cam phase value and the determined cam phase value will produce a higher volumetric efficiency, and then controlling the cam phase angle according to that cam phase value.

2. The method of claim 1, including the steps of:

determining a maximum achievable volumetric efficiency of said engine with said specified intake manifold vacuum level;

when the required volumetric efficiency is less than the maximum achievable volumetric efficiency, determining which of the scheduled cam phase value and the determined cam phase value will produce a higher volumetric efficiency, and controlling the cam phase angle according to that cam phase value; and when the required volumetric efficiency is at least as great as the maximum achievable volumetric efficiency, controlling the cam phase to a predetermined cam phase value.

3. The method of claim 2, wherein the predetermined cam phase value is a cam phase value for maximizing the volumetric efficiency of the engine based on current engine operating parameters.

4. The method of operation of claim 2, wherein the step of determining the maximum achievable volumetric efficiency includes the steps of:

retrieving a previously determined cam phase value for maximizing the volumetric efficiency of the engine based on current engine operating parameters; and determining the maximum achievable volumetric efficiency as a volumetric efficiency that occurs when the cam phase is controlled according to the retrieved cam phase value with the intake manifold vacuum at said specified level.

5. The method of operation of claim 1, wherein determining which of the scheduled cam phase value and the determined cam phase value will produce a higher volumetric efficiency includes the step of:

determining which of the scheduled cam phase value and the determined cam phase value is closest to a cam phase value for maximizing the volumetric efficiency of the engine based on current engine operating parameters.

* * * * *